US008603215B2

(12) United States Patent
Liu et al.

(10) Patent No.: US 8,603,215 B2
(45) Date of Patent: *Dec. 10, 2013

(54) COMPOSITION OF AMORPHOUS IRON OXIDE HYDROXIDE, DESULFURIZER COMPRISING THE SAME, AND METHODS FOR PREPARING AND REGENERATING THE DESULFURIZER

(75) Inventors: Zhenyi Liu, Beijing (CN); Xiangsheng Wang, Beijing (CN)

(73) Assignee: Beijing Sanju Environmental Protection and New Material Co., Ltd., Beijing (CN)

( * ) Notice: Subject to any disclaimer, the term of this patent is extended or adjusted under 35 U.S.C. 154(b) by 425 days.

This patent is subject to a terminal disclaimer.

(21) Appl. No.: 12/769,761

(22) Filed: Apr. 29, 2010

(65) Prior Publication Data

US 2010/0210449 A1    Aug. 19, 2010

Related U.S. Application Data

(63) Continuation-in-part of application No. 11/805,727, filed on May 24, 2007, now Pat. No. 7,717,979, and a continuation-in-part of application No. PCT/CN2009/001594, filed on Dec. 30, 2009.

(30) Foreign Application Priority Data

Aug. 28, 2006 (CN) .......................... 2006 1 0121945
May 31, 2009 (CN) .......................... 2009 1 0086345

(51) Int. Cl.
*C21B 3/02* (2006.01)
*C21B 5/02* (2006.01)
*C21B 7/06* (2006.01)
*C22C 1/06* (2006.01)
*C22B 1/14* (2006.01)

(52) U.S. Cl.
USPC ............................................. 75/319; 75/770

(58) Field of Classification Search
USPC ................................................. 75/319, 770
See application file for complete search history.

(56) References Cited

U.S. PATENT DOCUMENTS

| 7,037,876 | B2 | 5/2006 | O'Brien et al. |
| 7,717,979 | B2 | 5/2010 | Liu et al. |
| 2005/0123470 | A1 | 6/2005 | Ayyer et al. |
| 2005/0247636 | A1 | 11/2005 | Schlegel |
| 2008/0047395 | A1 | 2/2008 | Liu et al. |
| 2008/0241055 | A1 | 10/2008 | Kawase et al. |
| 2009/0169470 | A1 | 7/2009 | Kawase |

FOREIGN PATENT DOCUMENTS

| CN | 1121950 | 5/1996 |
| CN | 1133817 | 10/1996 |
| CN | 1034422 | 4/1997 |
| CN | 1312132 | 9/2001 |
| CN | 1368537 | 9/2002 |
| CN | 1114462 | 7/2003 |
| CN | 1136045 | 1/2004 |
| CN | 1539545 | 10/2004 |
| CN | 1704144 | 12/2005 |
| CN | 101070491 | 11/2007 |
| CN | 101584962 | 5/2008 |
| CN | 101585556 | 11/2009 |
| CN | 101585557 | 11/2009 |
| CN | 101767828 | 7/2010 |
| EP | 0215505 | 3/1987 |
| EP | 0628339 | 6/1994 |
| EP | 1857414 | 11/2007 |
| GB | 838571 | 6/1960 |
| JP | 59039345 | 3/1984 |
| JP | 6262066 | 9/1994 |
| JP | 10259026 | 9/1998 |
| WO | WO 2006088083 | 8/2006 |
| WO | WO 2009/150232 | 12/2009 |
| WO | WO 2010081290 | 7/2010 |

OTHER PUBLICATIONS

Response filed Feb. 14, 2013 for U.S. Appl. No. 13/174,743.
Response filed Feb. 15, 2013 for U.S. Appl. No. 13/172,898.
Response filed Feb. 28, 2013 for U.S. Appl. No. 13/172,893.
Gong Zhi-jian et al., "Research on Desulfurization Activity of Iron Oxyhydroxide Prepared with Different Alkali Ratios", *Coal Science and Technology*, 34(10): 44-46 (2006).
Gong Zhi-jian et al., "Research on Desulfurization Activity of Iron Oxide Hydroxides Prepared with Different Methods", *Coal Conversion*, 29 (3):71-74 (2006).
Liu and Liu, "The Characterization of an Active Components in a kind of Iron Oxides Desulfurizer with High Sulfur Capacity",National Information Center of Gas Purification Proceedings on Technical Seminar. 2006, pp. 107-111.
Office Action mailed May 3, 2012, for U.S. Appl. No. 13/172,893.
Response mailed Nov. 5, 2012 for U.S. Appl. No. 13/172,893.

(Continued)

*Primary Examiner* — Keith Walker
*Assistant Examiner* — Alexander Polyansky
(74) *Attorney, Agent, or Firm* — Womble Carlyle Sandridge & Rice LLP

(57) ABSTRACT

A desulfurizer containing at least a composition of a highly concentrated amorphous iron oxide hydroxide as the active ingredient. A method for preparing a composition containing at least a highly concentrated amorphous iron oxide hydroxide. A method for regenerating the desulfurizer. The desulfurizer contains at least the composition of a highly concentrated amorphous iron oxide hydroxide as the active ingredient and a binder. The composition and the desulfurizer have a high sulfur capacity and can be regenerated. This saves resources and reduces environmental pollution. The method for regenerating the desulfurizer includes at least the following steps: a) mixing a solid soluble ferrous salt with a solid hydroxide, b) kneading the mixture and allowing it to react at temperatures not exceeding 90° C., c) drying in air, d) washing with water and filtering to yield a solid, and e) drying naturally or roasting the solid.

5 Claims, No Drawings

(56) References Cited

OTHER PUBLICATIONS

Final Office Action mailed Nov. 29, 2012 for U.S. Appl. No. 13/172,893.
Office Action mailed Aug. 16, 2012 for U.S. Appl. No. 13/172,898.
Office Action mailed Jun. 12, 2012 for U.S. Appl. No. 13/174,728.
Response mailed Jul. 18, 2012 for U.S. Appl. No. 13/174,728.
Office Action mailed Jul. 27, 2012 for U.S. Appl. No. 13/174,728.
Response mailed Jan. 23, 2013 for U.S. Appl. No. 13/174,728.
Office Action mailed Jun. 29, 2012 for U.S. Appl. No. 13/174,743.
Response mailed Jul. 29, 2012 for U.S. Appl. No. 13/174,743.
Office Action mailed Aug. 14, 2012 for U.S. Appl. No. 13/174,743.
IDS dated Sep. 21, 2007 for U.S. Appl. No. 11/805,727.
OA mailed Mar. 31, 2009 for U.S. Appl. No. 11/805,727.
Response mailed Jun. 30, 2009 for U.S. Appl. No. 11/805,727.
Final OA mailed Oct. 28, 2009 for U.S. Appl. No. 11/805,727.
Response to Final OA mailed Dec. 14, 2009 for U.S. Appl. No. 11/805,727.
Notice of Allowance for U.S. Appl. No. 11/805,727 mailed Jan. 7, 2010.
Issue Fee Transmittal for U.S. Appl. No. 11/805,727 mailed Apr. 7, 2010.
Issue Notification for U.S. Appl. No. 11/805,727, Apr. 28, 2010.
Supplementary European Search Report and Search Opinion for EPO application No. 09845385.5, dated Nov. 5, 2012.
Eurasian Patent Office Action dated Feb. 15, 2013, for EA application No. 20117143.
Multiple-Site Adsorption of Cd, Cu, Zn, and Pb on Amorphous Iron Oxyhydroxide, Mark M. Benjamin and James O. Leckie, "Journal of Colloid and Interface Science,", vol. 79, No. 1, Jan. 1981.
European Extended Search Report for application No. PCT/CN2009001598, dated Jun. 25, 2012.
European Extended Search Report for application No. PCT/CN2009001597, dated May 28, 2012.
European Extended Search Report for application No. PCT/CN2009001596, dated Jun. 25, 2012.
European Extended Search Report for application No. PCT/CN2009001595, dated Jun. 25, 2012.
European Extended Search Report for application No. PCT/CN2009001594, dated Nov. 11, 2012.
Eurasian Patent Office Action dated Feb. 15, 2013, for EA application No. 201170905.
Eurasian Patent Office Action dated Mar. 21, 2013, for EA application No. 201170839.
Eurasian Patent Office Action dated Jan. 17, 2013, for EA application No. 201170904.
Eurasian Patent Office Action dated Jan. 17, 2013, for EA application No. 201170903.
Eurasian Patent Office Action dated Feb. 15, 2013, for EA application No. 201171473.

COMPOSITION OF AMORPHOUS IRON OXIDE HYDROXIDE, DESULFURIZER COMPRISING THE SAME, AND METHODS FOR PREPARING AND REGENERATING THE DESULFURIZER

This application is a continuation in-part of U.S. Ser. No. 11/805,727 filed on May, 24, 2007, now pending, which claims priority benefit to Chinese Patent Application No. 200610121945.4 filed on Aug. 28, 2006, and is a continuation in-part of International Patent Application No. PCT/CN2009//001594 with an international filing date of Dec. 30, 2009, designating the United States, which is based on Chinese Patent Application No. 200910086345.2 filed on May 31, 2009. The contents of all of the aforementioned applications, including any intervening amendments thereto, are incorporated herein by reference.

BACKGROUND OF THE INVENTION

1. Field of the Invention

The invention relates to a method for preparing a composition comprising amorphous iron oxide hydroxide and a desulfurizer, in which the composition is the active ingredient, and a method for regenerating the desulfurizer.

2. Description of the Related Art

Due to its good desulfurization performance, iron oxide hydroxide (FeOOH) desulfurizers have been widely used in the fields of chemistry and chemical engineering. Iron oxide hydroxide has several crystalline states, $\alpha$-FeOOH, $\beta$-FeOOH, $\gamma$-FeOOH, and amorphous-FeOOH, among which amorphous-FeOOH yields the best desulfurization performance. However, conventional laboratory methods for producing amorphous iron oxide hydroxide require a nitrogen atmosphere to prevent oxidation. The process is, therefore, complicated and unsuitable for mass production. Furthermore, the resultant amorphous iron oxide hydroxide has a compact and less porous structure, a low sulfur capacity, and a low yield.

Conventional desulfurizers have low sulfur capacities. Although the amorphous iron oxide hydroxide-based desulfurizer has a relatively high sulfur capacity, high purity amorphous iron oxide hydroxide is difficult to obtain. The reaction conditions, such as pH value, temperature, and oxidant, used during preparation yield a desulfurizer that contains less than 40 wt. % amorphous iron oxide hydroxide with more ferroferric oxide and ferric oxide. In addition, conventional desulfurizers, including iron-based desulfurizers, cannot be regenerated (or regeneration is costly) so that large quantities of waste product must be buried. The current state of the technology not only wastes resources but also pollutes the environment.

SUMMARY OF THE INVENTION

In view of the above-described problems, it is one objective of the invention to provide a method for preparing a composition comprising highly concentrated amorphous iron oxide hydroxide that is suitable for mass production.

It is another objective of the invention to provide a method for regenerating the high concentration composition of the amorphous iron oxide hydroxide after being used as a desulfurizer.

Another objective of the invention is to provide a desulfurizer that has a high sulfur capacity and can be regenerated.

Another objective of the invention is to provide a method for regenerating the desulfurizer.

To achieve the above objectives, in accordance with one embodiment of the invention, a method is provided for preparing a composition comprising highly concentrated amorphous iron oxide hydroxide. The method comprises the steps of a) mixing a solid soluble ferrous salt with a solid hydroxide, in a molar ratio of iron element to hydroxyl of between 1:2 and 1:3, to yield a mixture;
b) kneading the mixture and allowing it to react at temperatures not exceeding 70° C.;
c) drying in air;
d) washing with water and filtering to yield a solid; and
e) drying naturally or roasting the solid to yield a composition comprising amorphous iron oxide hydroxide.

In a class of this embodiment, the solid hydroxide is a hydroxide of Group IA elements.

In a class of this embodiment, the kneading is achieved using a kneader with a kneading time of at least 15 min, and particularly between 15 and 30 min In a class of this embodiment, the kneading temperature critically does not exceed 70° C.

In a class of this embodiment, the kneading temperature does not exceed 50° C.

In a class of this embodiment, the temperature for natural drying is between −5 and 45° C., and the temperature for roasting does not exceed 100° C. Temperatures between 80 and 100° C. are preferred.

In a class of this embodiment, the weight percent of the amorphous iron oxide hydroxide in the composition is 65.0-100% and the remaining material comprises water and by-products.

In a class of this embodiment, the weight percent of the amorphous iron oxide hydroxide in the composition is 95.0-97.0% and the remaining material comprises water and by-products.

In accordance with another embodiment of the invention, a method is provided for regenerating the composition comprising highly concentrated amorphous iron oxide hydroxide after being used as a desulfurizer. The method of regeneration comprising the steps of a) grinding the waste mixture that results from the use of the composition comprising highly concentrated amorphous iron oxide hydroxide desulfurizer into a waste powder;
b) preparing the waste powder in a suspension and charging the suspension with a gas containing oxygen to obtain a slurry comprising amorphous iron oxide hydroxide and elemental sulfur; and
c) filtering the slurry to yield a solid and extracting the elemental sulfur from the solid using a solvent to regenerate the composition comprising amorphous iron oxide hydroxide.

Regeneration of the composition comprising amorphous iron oxide hydroxide the regeneration of the amorphous iron oxide hydroxide according to the chemical reaction: $2FeOOH+3H_2S=Fe_2S_3 \cdot H_2O+3H_2O$, $Fe_2S_3 \cdot H_2O+3/2O_2=2FeOOH+3S$.

In a class of this embodiment, prior to grinding, the waste mixture is washed with water.

In a class of this embodiment, the extracted solution is concentrated to yield crystallized elemental sulfur.

In a class of this embodiment, the weight percent of the solid in the suspension is 5-30%, particularly 10-15%.

In a class of this embodiment, the gas containing oxygen is air.

In a class of this embodiment, the solvent is a nonpolar solvent, either carbon tetrachloride or carbon disulfide.

In a class of this embodiment, the waste mixture is ground into particles of size 100-400 mesh, particularly 200 mesh.

In accordance with an embodiment of the invention, a method is provided for regenerating the composition comprising highly concentrated amorphous iron oxide hydroxide after being used as a desulfurizer. The method of regeneration comprises the steps:
 a) grinding the waste mixture resulting from the use of the composition comprising highly concentrated amorphous iron oxide hydroxide desulfurizer into a waste powder;
 b) preparing the waste powder in a suspension and charging with a gas containing oxygen to obtain a slurry comprising amorphous iron oxide hydroxide and elemental sulfur; and
 c) placing the slurry or solid resulting from filtering of the slurry into a reactor and charging the slurry with air so that the elemental sulfur floats and the amorphous iron oxide hydroxide precipitates.

In a class of this embodiment, prior to grinding, the waste mixture is washed with water.

In a class of this embodiment, the method includes separation of the floated elemental sulfur.

In a class of this embodiment, the weight percent of the solid in the suspension is 5-30%, particularly 10-15%.

In a class of this embodiment, the gas containing oxygen is air.

In a class of this embodiment, an auxiliary agent is added to the reactor to accelerate the floating and separation of the elemental sulfur, the auxiliary agent being water glass and kerosene.

In a class of this embodiment, the reactor is a flotation tank.

In a class of this embodiment, the waste mixture is ground into particles of size 100-400 mesh, particularly 200 mesh.

In the amorphous iron oxide hydroxide, oxygen atoms are arranged in a cubic close-packed structure, and iron centers are arranged in a tetrahedral or octahedral cavity formed by the oxygen atoms. The two form a short-range ordered and long-range disordered structure that has good stability and a strong binding capacity toward sulfur atoms. The amorphous iron oxide hydroxide has a high sulfur capacity and good desulfurization properties.

In accordance with another embodiment of the invention, a desulfurizer is provided that has a high sulfur capacity and can be regenerated. The desulfurizer comprises a composition comprising amorphous iron oxide hydroxide and an organic binder, wherein the composition comprising amorphous iron oxide hydroxide is prepared according to the following steps:
 a) mixing of a solid soluble ferrous salt with a solid hydroxide, in a molar ratio of iron element to hydroxyl of between 1:2 and 1:3, to yield a mixture;
 b) kneading the mixture and allowing it to react at temperatures not exceeding 90° C.;
 c) drying in air, washing with water, and filtering to yield a solid; and
 d) drying naturally or roasting the solid to yield amorphous iron oxide hydroxide.

In a class of this embodiment, the desulfurizer further comprises an additive.

In a class of this embodiment, the desulfurizer comprises the composition comprising amorphous iron oxide hydroxide at a content of 88-93 wt. %, and the organic binder is present at 7-12 wt. %.

In a class of this embodiment, the desulfurizer comprises the composition comprising amorphous iron oxide hydroxide at a content of 88-92 wt. %, with 7-11 wt. % organic binder and 1-5 wt. % additive.

In a class of this embodiment, the organic binder is sodium carboxymethylcellulose, Sesbania powder, cellulose powder, or a mixture thereof.

In a class of this embodiment, the additive is sawdust powder, rice hull powder, wheat bran powder, or a mixture thereof.

In a class of this embodiment, the solid hydroxide is a hydroxide of Group IA or Group IIA elements.

In a class of this embodiment, kneading is achieved using a kneader with a kneading time of at least 15 min, with kneading times between 15 and 30 min being optimal.

In a class of this embodiment, the kneading temperature does not exceed 70° C., and particularly does not exceed 50° C. under optimal conditions.

In a class of this embodiment, the temperature of the natural drying process is maintained between −5 and 45° C., and the temperature for roasting does not exceed 100° C. Temperatures between 80 and 100° C. are particularly favored.

A method for preparing the desulfurizer with a high sulfur capacity and regeneration capabilities comprises the following steps:
 a) mixing the composition comprising amorphous iron oxide hydroxide and the organic binder, or mixing the composition comprising amorphous iron oxide hydroxide, the organic binder, and the additive to yield a mixture;
 b) shaping the mixture into a strip, a ball, or a pill; and
 c) naturally drying the strip, the ball, or the pill at temperatures between −5 and 45° C., or roasting the strip, the ball, or the pill at temperatures between 60 and 90° C. to yield the desulfurizer.

Regeneration of the desulfurizer includes regeneration of the amorphous iron oxide hydroxide as described in the chemical equation: $2FeOOH+3H_2S=Fe_2S_3 \cdot H_2O+3H_2O$, $Fe_2S_3 \cdot H_2O+3/2O_2=2FeOOH+3S$.

In accordance with another embodiment of the invention, a method is provided for regenerating the desulfurizer, the steps of which include
 a) grinding the waste mixture resulting from the use of the desulfurizer into a waste powder;
 b) preparing the waste powder as a suspension and charging the suspension with a gas containing oxygen to obtain a slurry comprising amorphous iron oxide hydroxide and elemental sulfur;
 c) placing the slurry or solid resulting from filtering the slurry into a reactor, charging the slurry with air so that the elemental sulfur floats and is separated, and collecting the precipitate from the bottom of the reactor; and
 d) adding the organic binder or the organic binder and the additive to the precipitate to yield the desulfurizer.

In a class of this embodiment, prior to grinding, the waste mixture is washed with water.

In a class of this embodiment, the method further comprises separating the floated elemental sulfur.

In a class of this embodiment, the weight percent of solid in the suspension is 5-30%, particularly 10-15%.

In a class of this embodiment, the gas containing oxygen is air.

In a class of this embodiment, an auxiliary agent is added to the reactor to accelerate the floatation of the elemental sulfur. The auxiliary agent is water glass and kerosene.

In a class of this embodiment, the reactor is a flotation tank.

In a class of this embodiment, the waste mixture is ground into particles of size 100-400 mesh, particularly 200 mesh.

In accordance with another embodiment of the invention, a method is provided for regenerating the desulfurizer, the steps of which comprise a) grinding the waste mixture resulting from the use of the desulfurizer into a waste powder;

b) preparing the waste powder in a suspension and charging with a gas containing oxygen to obtain a slurry comprising amorphous iron oxide hydroxide and elemental sulfur;

c) filtering the slurry to yield a solid and extracting the elemental sulfur from the solid using a solvent; and d) adding the organic binder or the organic binder and the additive to the solid to yield the desulfurizer.

In a class of this embodiment, prior to grinding, the waste mixture is washed with water.

In a class of this embodiment, the extracted solution is concentrated to yield crystallized elemental sulfur.

In a class of this embodiment, the weight percent of the solid in the suspension is 5-30%, particularly 10-15%.

In a class of this embodiment, the gas containing oxygen is air.

In a class of this embodiment, the solvent is a nonpolar solvent, either carbon tetrachloride or carbon disulfide.

In a class of this embodiment, the waste mixture is ground into particles of size 100-400 mesh, particularly 200 mesh.

The advantages of the invention are summarized below:

1. The method for preparing the composition comprising amorphous iron oxide hydroxide is not limited to a laboratory and can be realized by industrial mass production. The resultant composition has a high concentration of amorphous iron oxide hydroxide (65-100%) and a high sulfur capacity (up to 62%);

2. Because the composition comprising amorphous iron oxide hydroxide has a high sulfur capacity, the desulfurizer comprising the composition has a high sulfur capacity (in the absence of oxygen, a one-time sulfur capacity can reach 56%) and is easily regenerated;

3. The desulfurizer can optionally comprise an additive selected from the following: sawdust powder, rice hull powder, wheat bran powder, or a mixture thereof, so that the desulfurizer has a loose structure and absorbs sulfide easily;

4. The organic binder selected from sodium carboxymethylcellulose, Sesbania powder, cellulose powder, or a mixture thereof does not cover the surface of the amorphous iron oxide hydroxide. Therefore, the desulfurization activity is not inhibited and the desulfurizer has a high sulfur capacity;

5. Dry kneading of the solid soluble ferrous salt with the solid hydroxide to prepare the composition comprising amorphous iron oxide hydroxide prevents the production of colloidal $Fe(OH)_2$. The process of colloid filtration is thereby avoided; by maintaining the reaction temperature below 70° C. (particularly below 50° C.), the main product is amorphous iron oxide hydroxide, and it is guaranteed that no other iron oxides will form, such as ferroferric oxide, ferric oxide, etc.;

6. Dry kneading the solid soluble ferrous salt with the solid hydroxide to prepare the composition comprising amorphous iron oxide hydroxide prevents production of a solution. The process of removing a waste solution is thereby avoided;

7. Upon preparing the composition comprising amorphous iron oxide hydroxide, mixing of the solid soluble ferrous salt with the solid hydroxide was completed in one step, which is practical and suitable for mass production;

8. Control over the drying or roasting temperatures guarantees the minimal production of ferric iron;

9. Generation of the composition comprising amorphous iron oxide hydroxide and the desulfurizer saves resources and reduces environmental pollution;

10. The method for generating amorphous iron oxide hydroxide further produces elemental sulfur, which optimizes resource utilization;

11. Washing the waste mixture with water prior to grinding can effectively remove impurities that cover the surface of the waste mixture so as not to affect the subsequent reaction;

12. In the regeneration process, oxidation of the suspension by the gas containing oxygen is controllable and has good effects; the weight percent of the solid in the suspension is preferably between 10 and 15%, which guarantees the oxidation speed and complete oxidation;

13. The separation of amorphous iron oxide hydroxide from elemental sulfur by flotation is achieved by charging the slurry with air and is purely a physical method. This method is economical and environmentally friendly;

14. The waste mixture is ground into particles of size 100-400 mesh (particularly 200 mesh), which improves oxidation, extraction, and flotation separation; and 15. The composition comprising amorphous iron oxide hydroxide can be further used in other fields.

DETAILED DESCRIPTION OF THE EMBODIMENTS

To illustrate the invention, experiments detailing the method for preparing a composition comprising amorphous iron oxide hydroxide, a desulfurizer, and a preparation method thereof, as well as a desulfurizer regeneration method, are described below. It should be noted that the following examples are intended to describe and not to limit the invention.

Example 1

Preparation of the Composition Comprising Amorphous Iron Oxide Hydroxide 640 g ferrous sulfate powder was mixed uniformly with 240 g sodium hydroxide in a molar ratio of iron element to hydroxyl of 1:2.8. The resultant mixture was kneaded by a kneader at a temperature not exceeding 50° C. for 3 h then dried in air to start the reaction. The dried mixture was washed with water repeatedly and stirred until no sulfate remained in solution (as determined by a barium chloride test). The solution was filtered using a centrifuge and the resultant solid was roasted at 80° C. for 3 h to yield a composition comprising amorphous iron oxide hydroxide (composition A). In the composition, the weight percent of amorphous iron oxide hydroxide was 97.0% and the remaining material comprised $NaSO_4$ and water, with a sulfur capacity of 52%. The concentration of amorphous iron oxide hydroxide was measured using the titanium trichloride-potassium dichromate volumetric method, which is the national standard (GB6730.5-86) for iron ore analysis.

Regeneration of Composition A after Desulfurization

To a desulfurization reactor was added composition A. After passing $H_2S$ through the reactor, the resultant waste mixture was washed with water and ground in the presence of water using a wet ball mill into powders of particle size 300 mesh. An aqueous suspension of the powders was prepared with a solid weight percent of 15%. Compressed air was charged into the suspension and a sample was collected for testing. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid that was extracted thrice with $CCl_4$. The extract was combined and distilled to yield crystallized elemental sulfur. The solid remaining after extraction was a composition comprising amorphous iron oxide hydroxide. The composition was roasted and could be reused as a desulfurizer. The composition had a sulfur capacity of 50%. After second, third, and fourth rounds of regeneration, the composition had a sulfur capacity of 48%, 45%, and 43%, respectively.

Preparation and Regeneration of the Desulfurizer 500 g composition A comprising amorphous iron oxide hydroxide with a particle size of 100 mesh, 40 g Sesbania powder, and 10 g sawdust were mixed uniformly, kneaded with appropriate quantities of water using a small kneader, and extruded using a small twin screw extruder to yield a strip desulfurizer. The desulfurizer was roasted in an oven at 70° C. for 6 h and the sulfur capacity thereof was measured to be 47%. The desulfurizer was named desulfurizer A.

To a desulfurization reactor was added the desulfurizer A. After passing $H_2S$ through the reactor, the resultant waste mixture was washed with water and ground in the presence of water using a wet ball mill into powders of particle size 100 mesh. An aqueous suspension of the powders was prepared with a solid weight percent of 10%. Compressed air was charged into the slurry and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank, water was added, and air was charged. The elemental sulfur, additive, and binder were removed, together with excess air, by overflowing the tank. The precipitate in the bottom of the tank was a composition comprising amorphous iron oxide hydroxide. The overflowed elemental sulfur could be purified by some form of extraction procedure. The composition comprising amorphous iron oxide hydroxide was roasted at 80° C., and Sesbania powder and sawdust were added according to the proportions described above. The mixture was treated in accordance with the method and reaction conditions described above to yield a new desulfurizer (desulfurizer B) with a sulfur capacity of 45%.

The desulfurizer B was used to desulfurize and was regenerated according to the process described for the desulfurizer A. A new desulfurizer (desulfurizer C) with a sulfur capacity of 43% was obtained.

After four rounds of desulfurizing and regenerating, the fifth desulfurizer generated (desulfurizer E) had a sulfur capacity of 38.5%.

Example 2

Preparation of a Composition Comprising Amorphous Iron Oxide Hydroxide 640 g ferrous sulfate powder was mixed uniformly with 212 g sodium hydroxide in a molar ratio of iron element to hydroxyl of 1:2.4. The resultant mixture was kneaded using a kneader at a temperature not exceeding 55° C. for 0.5 h then dried in air. The dried mixture was washed with water and stirred repeatedly until no sulfate was detected in solution (tested with barium chloride). The solution was filtered with a centrifuge and the resultant solid was dried naturally at −5° C. for 10 h to yield a composition comprising amorphous iron oxide hydroxide (composition B). In the composition, the weight percent of amorphous iron oxide hydroxide was 95.8% and the remaining material comprised $NaSO_4$ and water, with a sulfur capacity of 51.8%.

Regeneration of Composition B after being used for Desulfurization

To a desulfurization reactor was added composition B. After passing $H_2S$ through the reactor, the resultant waste mixture was washed with water and ground in the presence of water using a wet ball mill into powders of particle size 100 mesh. An aqueous suspension of the powders was prepared with a solid weight percent of 5%, compressed air was charged into the suspension, and a sample was collected for testing. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was filtered to yield a solid. The solid was placed in a flotation tank, water was added, and air was charged. Due to the hydrophobicity, elemental sulfur floated and was removed by overflowing the tank. The precipitate in the bottom of the tank was a composition comprising amorphous iron oxide hydroxide. The overflowed elemental sulfur could be purified by some form of extraction procedure. The composition was roasted and could be reused as a desulfurizer. The composition had an initial sulfur capacity of 50%. After second, third, and fourth rounds of regeneration, the composition had a sulfur capacity of 47%, 46%, and 45%, respectively.

Preparation and Regeneration of the Desulfurizer 400 g composition B comprising amorphous iron oxide hydroxide with particle size 100 mesh, 48 g Sesbania powder, and 5 g rice hull powder were mixed uniformly, kneaded with appropriate quantities of water using a small kneader, and extruded using a small twin screw extruder to yield a strip. The strip was subsequently treated using a pill machine to yield a pill desulfurizer. The desulfurizer was roasted in an oven at 60° C. for 7 h, and the sulfur capacity thereof was measured to be 45%. The desulfurizer was named desulfurizer A.

To a desulfurization reactor was added desulfurizer A. After passing $H_2S$ through the reactor, the resultant waste mixture was washed with water and ground in the presence of water using a wet ball mill into powders of particle size 200 mesh. An aqueous suspension of the powders was prepared with a solid weight percent of 15%, compressed air was charged, and a sample was collected for testing. When no $H_2S$ was produced from the reaction between the sample and hydrochloric acid, the iron sulfide in the suspension was determined to be completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The remaining solid after extraction was a composition comprising amorphous iron oxide hydroxide. The composition comprising amorphous iron oxide hydroxide was roasted at 70° C., and Sesbania powder and rice hull powder were added according to the proportions described above. The mixture was treated according to the method and reaction conditions described above to yield a new desulfurizer (desulfurizer B) with a sulfur capacity of 44%.

The desulfurizer B was used for desulfurization and was regenerated according to the process described for the regeneration of desulfurizer A. A new desulfurizer (desulfurizer C) with a sulfur capacity of 42.5% was thereby obtained.

Example 3

Preparation of a Composition Comprising Amorphous Iron Oxide Hydroxide 686 g ferrous nitrate powder was mixed uniformly with 468 g potassium hydroxide in a molar ratio of iron element to hydroxyl of 1:2.0. The resultant mixture was kneaded using a kneader at a temperature not exceeding 58° C. for 1 h then dried in air. The dried mixture was washed with water and stirred until no sulfate was detected in the solution (tested using barium chloride). The solution was filtered with a centrifuge and the resultant solid was dried naturally at 45° C. for 3 h to yield a composition comprising amorphous iron oxide hydroxide (composition C). In the composition, the weight percent of amorphous iron oxide hydroxide was 96.1% and the remaining solid comprised $KNO_3$ and water, with a sulfur capacity of 51.3%.

Regeneration of the Composition C after being used for Desulfurization

To a desulfurization reactor was added composition C. After passing $H_2S$ through the reactor, the resultant waste mixture was washed with water and ground in the presence of water using a wet ball mill into powders of particle size 200 mesh. An aqueous suspension of the powders was prepared with a solid weight percent of 10%, compressed air was charged into the suspension, and a sample was collected for testing. When no $H_2S$ was produced from the reaction between the sample and hydrochloric acid, the iron sulfide in the suspension was determined to have completely transformed into a slurry comprising amorphous iron oxide hydroxide and elemental sulfur. The slurry was placed in a flotation tank. Water, as an auxiliary agent, and water glass and kerosene were added, and air was charged into the slurry. Due to its hydrophobicity, elemental sulfur floated and was removed by overflowing the tank. The precipitate at the bottom of the tank was a composition comprising amorphous iron oxide hydroxide. The composition was roasted and could be reused as a desulfurizer. The composition had a sulfur capacity of 50%. After second, third, and fourth rounds of regeneration, the composition had a sulfur capacity of 49%, 47%, and 45%, respectively. The auxiliary agent accelerated the separation of the amorphous iron oxide hydroxide and the elemental sulfur.

Preparation and Regeneration of the Desulfurizer 1000 g composition C comprising amorphous iron oxide hydroxide with particle size 100 mesh and 80 g Sesbania powder were mixed uniformly in a mixer and extruded using a sugar coater to yield a ball desulfurizer (D3-5). The desulfurizer was roasted in an oven at 90° C. for 4 h, and the sulfur capacity thereof was measured to be 48%. The desulfurizer was named desulfurizer A.

To a desulfurization reactor was added desulfurizer A. After passing $H_2S$ through the reactor, the resultant waste mixture was washed with water and ground in the presence of water using a wet ball mill into powders with particle size 400 mesh. An aqueous suspension of the powders was prepared with a solid weight percent of 5%, compressed air was charged, and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank. Water, as an auxiliary agent, and water glass and kerosene were added, and air was charged into the slurry, and the elemental sulfur, additive, and binder were removed, together with excess air, from the tank by overflowing. The precipitate at the bottom of the tank was a composition comprising amorphous iron oxide hydroxide. The overflowed elemental sulfur could be purified by some form of extraction. The composition comprising amorphous iron oxide hydroxide was roasted at 80° C., and Sesbania powder was added according to the proportions listed above. The mixture was treated following the method and reaction conditions described above to yield a new desulfurizer (Desulfurizer B) with a sulfur capacity of 46%.

The desulfurizer B was used for desulfurization and was regenerated according to the process described for the regeneration of desulfurizer A, and a new desulfurizer (Desulfurizer C) with a sulfur capacity of 44% was obtained.

After four applications of the process, a fifth desulfurizer (desulfurizer E) with a sulfur capacity of 40% was obtained. The auxiliary agent accelerated the separation of amorphous iron oxide hydroxide and elemental sulfur.

Example 4

Preparation of a Composition Comprising Amorphous Iron Oxide Hydroxide 640 g ferrous sulfate powder was mixed uniformly with 220 g sodium hydroxide in a molar ratio of iron element to hydroxyl of 1:2.5. The resultant mixture was kneaded using a kneader at a temperature not exceeding 60° C. for 15 min then dried in air. The dried mixture was washed with water and stirred until no sulfate was detected in solution (tested using barium chloride). The solution was filtered with a centrifuge and the resultant solid was roasted at 90° C. for 3 h to yield a composition comprising amorphous iron oxide hydroxide (composition D). In the composition, the weight percent of amorphous iron oxide hydroxide was 95.6% and the remaining solid comprised $NaSO_4$ and water, with a sulfur capacity of 51.3%.

Regeneration of Composition D after being used for Desulfurization

To a desulfurization reactor was added composition D. After passing $H_2S$ through the reactor, the resultant waste mixture was washed with water and ground in the presence of water using a wet ball mill into powders of particle size 400 mesh. An aqueous suspension of the powders was prepared with a solid weight percent of 30%, compressed air was charged into the slurry, and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was extracted thrice with $CS_2$. The extract was combined and distilled to yield crystallized elemental sulfur. The solid remaining after extraction was a composition comprising amorphous iron oxide hydroxide. The composition was roasted and could be reused as a desulfurizer. The composition had an initial sulfur capacity of 50%. After second, third, and fourth rounds of regeneration, the composition had a sulfur capacity of 48%, 47%, and 45%, respectively.

Preparation and Regeneration of the Desulfurizer 500 g composition D comprising amorphous iron oxide hydroxide with a particle size of 100 mesh, 45 g sodium carboxymethylcellulose, and 10 g wheat bran powder were mixed uniformly, kneaded with appropriate quantities of water using a small kneader, and extruded using a small twin screw extruder to yield a strip that was subsequently treated with a pill machine to yield a pill desulfurizer. The desulfurizer was roasted in an oven at 75° C. for 5 h and the sulfur capacity thereof was measured to be 46%. The desulfurizer was named desulfurizer A.

To a desulfurization reactor was added desulfurizer A. After passing $H_2S$ through the reactor, the resultant waste mixture was washed with water and ground in the presence of water using a wet ball mill into powders with particle size 200 mesh. An aqueous suspension of the powders was prepared with a solid weight percent of 30%, compressed air was charged into the slurry, and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid. The solid was placed into a flotation tank. After water, as an auxiliary agent, and water glass and kerosene were added and air was charged into the slurry, the elemental sulfur, additive, and binder were removed, together with excess air, by overflowing the tank. The precipitate at the bottom of the tank was a composition comprising amorphous iron oxide hydroxide. The overflowed elemental sulfur could be purified by some form of extraction procedure. The composition comprising amorphous iron oxide hydroxide was roasted at 75° C., and sodium carboxymethylcellulose as well as wheat bran powders was added according to the proportions described above. The mixture was treated according to the method and reaction conditions described above to yield a new desulfurizer (desulfurizer B) with a sulfur capacity of 43.6%.

The desulfurizer B was used for desulfurization and regenerated according to the process described for the regeneration of desulfurizer A, and a new desulfurizer (desulfurizer C) with a sulfur capacity of 40% was obtained.

After four rounds of desulfurizing and regeneration, a fifth desulfurizer (desulfurizer E) with a sulfur capacity of 36% was obtained.

Example 5

Preparation of Composition Comprising Amorphous Iron Oxide Hydroxide 640 g ferrous sulfate powder was mixed uniformly with 220 g sodium hydroxide in a molar ratio of iron to hydroxyl of 1:2.5. The resultant mixture was kneaded using a kneader at a temperature not exceeding 65° C. for 2 h, then dried in air. The dried mixture was washed with water and stirred until no sulfate was detected in solution (generally tested by barium chloride) in the solution. The solution was filtered with a centrifuge and the resultant solid was dried naturally at 30° C. for 1 h to yield a composition comprising amorphous iron oxide hydroxide (named composition E). In the composition, the weight percent of amorphous iron oxide hydroxide was 95.2% and the remaining material comprised $NaSO_4$ and water, with a sulfur capacity of 51.0%.

Regeneration of Composition E after being used for Desulfurization

To a desulfurization reactor was added composition E. After passing $H_2S$ through the reactor, the resultant waste mixture was washed with water and ground in the presence of water using a wet ball mill into powders with a particle size of 400 mesh. An aqueous suspension of the powders was prepared with a solid weight percent of 30%, compressed air was charged into the suspension, and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was added to a flotation tank. Water, as an auxiliary agent, and water glass and kerosene were added, and air was charged into the slurry. Due to hydrophobicity, the elemental sulfur was removed by overflowing the tank. The precipitate in the bottom of the tank was a composition comprising amorphous iron oxide hydroxide. The composition was roasted and could be reused as a desulfurizer. The composition had a sulfur capacity of 50%. After second, third, and fourth rounds of regeneration, the composition had a sulfur capacity of 48%, 46%, and 44%, respectively.

Preparation and Regeneration of Desulfurizer 500 g composition E comprising amorphous iron oxide hydroxide and with a particle size of 100 mesh and 50 g cellulose powder were mixed uniformly, kneaded with appropriate quantities of water using a small kneader, and extruded using a small twin screw extruder to yield a strip that was subsequently treated using a pill machine to yield a pill desulfurizer. The desulfurizer was roasted in an oven at 80° C. for 4 h and the sulfur capacity thereof was measured to be 45%. The desulfurizer was named desulfurizer A.

To a desulfurization reactor was added desulfurizer A. After passing $H_2S$ through the reactor, the resultant waste mixture was washed with water and ground in the presence of water using a wet ball mill into powders with a particle size of 200 mesh. An aqueous suspension of the powders was prepared with a solid weight percent of 15%, compressed air was charged into the suspension, and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was extracted thrice with $CCl_4$. The extract was combined and distilled to yield crystallized elemental sulfur. The remaining solid after extraction was a composition comprising amorphous iron oxide hydroxide. The composition comprising amorphous iron oxide hydroxide was roasted at 70° C., and cellulose powders were added according to the proportions described above. The mixture was treated following the method and reaction conditions described above to yield a new desulfurizer (desulfurizer B) with a sulfur capacity of 44%.

The desulfurizer B was used for desulfurization and regenerated according to the process described for the regeneration of desulfurizer A. A new desulfurizer (desulfurizer C) with a sulfur capacity of 42.5% was obtained.

Example 6

Preparation of Composition Comprising Amorphous Iron Oxide Hydroxide 640 g ferrous sulfate powder was mixed uniformly with 220 g sodium hydroxide in a molar ratio of iron element to hydroxyl of 1:2.5. The resultant mixture is kneaded by a kneader at a temperature not exceeding 70° C. for 25 min then dried in air. The dried mixture was washed with water and stirred until no sulfate was detected in solution (generally tested by barium chloride). The solution was filtered using a centrifuge and the resultant solid was dried naturally at 30° C. for 1 h to yield a composition comprising amorphous iron oxide hydroxide (named composition F). In the composition, the weight percent of amorphous iron oxide hydroxide was 95.3% and the remaining material comprised $NaSO_4$ and water, with a sulfur capacity of 50.8%.

Regeneration of the Composition F after being used for Desulfurization

To a desulfurization reactor was added composition F. After passing $H_2S$ through the reactor, the resultant waste mixture was washed with water and ground in the presence of water using a wet ball mill into powders with a particle size of 300 mesh. An aqueous suspension of the powders was prepared with a solid weight percent of 15%, compressed air was charged into the suspension, and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was extracted thrice with $CCl_4$. The extract was combined and distilled to yield crystallized elemental sulfur. The remaining solid after extraction was a composition comprising amorphous iron oxide hydroxide. The composition was roasted and could be reused as a desulfurizer. The composition had a sulfur capacity of 48%. After second, third, and fourth rounds of regeneration, the composition had a sulfur capacity of 46%, 44%, and 42%, respectively.

Preparation and Regeneration of the Desulfurizer 500 g composition F comprising amorphous iron oxide hydroxide and with a particle size of 100 mesh, 40 g cellulose powder, and 6 g rice hull powder were mixed uniformly, kneaded with appropriate quantities of water using a small kneader, and extruded using a small twin screw extruder to yield a strip that was subsequently treated using a pill machine to yield a pill desulfurizer. The desulfurizer was dried naturally at room temperature for 20 h and the sulfur capacity thereof was measured to be 47.5%. The desulfurizer was named desulfurizer A.

To a desulfurization reactor was added the desulfurizer A. After $H_2S$ passed through the reactor, the resultant waste mixture was washed with water and ground in the presence of water using a wet ball mill into powders with a particle size of 200 mesh. An aqueous suspension of the powders was prepared with a solid weight percent of 30%, compressed air was charged, and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid that was placed in a flotation tank. After water, as an auxiliary agent, and water glass and kerosene were added and air was charged into the slurry, the elemental sulfur, additive, and binder were removed, together with excess air, by overflowing the tank. The precipitate at the bottom of the tank was a composition comprising amorphous iron oxide hydroxide. The overflowed elemental sulfur could be purified by some form of extraction procedure. The composition comprising amorphous iron oxide hydroxide was roasted at 75° C., and cellulose powder and rice hull powder were added according to the proportions described above. The mixture was treated according to the method and reaction conditions described above to yield a new desulfurizer (desulfurizer B) with a sulfur capacity of 45%.

The desulfurizer B was used for desulfurization and was regenerated according to the process described for the regeneration of desulfurizer A, and a new desulfurizer (desulfurizer C) with a sulfur capacity of 42% was obtained.

Example 7

Preparation of the Composition Comprising Amorphous Iron Oxide Hydroxide 64 g ferrous sulfate powder were mixed uniformly with 20 g sodium hydroxide in a molar ratio of iron element to hydroxyl of 1:2.3. The resultant mixture was kneaded using a kneader at a temperature not exceeding 75° C. for 30 min then dried in air. The dried mixture was washed with water and stirred repeatedly until no sulfate was detected in solution (generally tested by barium chloride). The solution was filtered with a centrifuge and the resultant solid was roasted at 100° C. for 1 h to yield a composition comprising amorphous iron oxide hydroxide (composition G). In the composition, the weight percent of amorphous iron oxide hydroxide was 95.6%, and the remaining material comprised $NaSO_4$ and water, with a sulfur capacity of 50.2%.

Regeneration of Composition G after being used for Desulfurization

To a desulfurization reactor was added composition G. After passing $H_2S$ through the reactor, the resultant waste mixture was washed with water and ground in the presence of water using a wet ball mill into powders with a particle size of 100 mesh. An aqueous suspension of the powders was prepared with a solid weight percent of 5%, compressed air was charged into the suspension, and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank, water was added, and air was charged into the slurry. Due to its hydrophobicity, elemental sulfur was removed by overflowing the tank. The precipitate in the bottom of the tank was a composition comprising amorphous iron oxide hydroxide. The overflowed elemental sulfur could be purified by some form of extraction procedure. The composition was roasted and could be reused as a desulfurizer. The composition had a sulfur capacity of 48%. After second, third, and fourth rounds of regeneration, the composition had a sulfur capacity of 46%, 44%, and 42%, respectively.

Preparation and Regeneration of the Desulfurizer 500 g composition G comprising amorphous iron oxide hydroxide with a particle size of 100 mesh and 67 g sodium carboxymethylcellulose were mixed uniformly, kneaded with appropriate quantities of water using a small kneader, and extruded using a small twin screw extruder to yield a strip that was subsequently treated using a pill machine to yield a pill desulfurizer. The desulfurizer was roasted in an oven at 75° C. for 5 h, and the sulfur capacity thereof was measured to be 49%. The desulfurizer was named desulfurizer A.

To a desulfurization reactor was added the desulfurizer A. After passing $H_2S$ through the reactor, the resultant waste mixture was washed with water and ground in the presence of water using a wet ball mill into powders with a particle size 200 mesh. An aqueous suspension of the powders was prepared with a solid weight percent of 30%, compressed air was charged into the suspension, and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was filtered to yield a solid. The solid was placed into a flotation tank. After water, as an auxiliary agent, and water glass and kerosene were added and air was charged into the slurry, the elemental sulfur, additive, and binder were removed, together with excess air, by overflowing the tank. The precipitate in the bottom of the tank was a composition comprising amorphous iron oxide hydroxide. The overflowed elemental sulfur could be purified by some form of extraction procedure. The composition comprising amorphous iron oxide hydroxide was roasted at 75° C., and sodium carboxymethylcellulose was added according to the proportions described above. The mixture was treated according to the method and reaction conditions described above to yield a new desulfurizer (Desulfurizer B) with a sulfur capacity of 47%.

The desulfurizer B was used for desulfurization and was regenerated according to the process described for the regeneration of desulfurizer A. A new desulfurizer (desulfurizer C) with a sulfur capacity of 45.5% was obtained.

After four rounds of desulfurizing and regeneration, the fifth desulfurizer (desulfurizer E) had a sulfur capacity of 42%.

Example 8

Preparation of a Composition Comprising Amorphous Iron Oxide Hydroxide 920 g ferrous sulfate powder were mixed uniformly with 280 g sodium hydroxide in a molar ratio of iron element to hydroxyl of 1:2.2. The resultant mixture was kneaded using a kneader at a temperature not exceeding 90° C. for 30 min then dried in air. The dried mixture was washed with water and stirred until no sulfate was detected in solution (tested using barium chloride). The solution was filtered with a centrifuge and the resultant solid was dried naturally at 45° C. for 1 h to yield a composition comprising amorphous iron oxide hydroxide (composition H). In the composition, the weight percent of amorphous iron oxide hydroxide was 96.5% and the remaining material comprised $NaSO_4$ and water, with a sulfur capacity of 49.5%.

Regeneration of the Composition H after being used for Desulfurization

To a desulfurization reactor was added composition H. After passing $H_2S$ through the reactor, the resultant waste mixture was washed with water and ground in the presence of water using a wet ball mill into powders with a particle size of 200 mesh. An aqueous suspension of the powders was prepared with a solid weight percent of 10%, compressed air was charged into the suspension, and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank. Water, as an auxiliary agent, and water glass and kerosene were added, and air was charged into the slurry. Due to its hydrophobicity, elemental sulfur was removed by overflowing the tank. The precipitate in the bottom of the tank was a composition comprising amorphous iron oxide hydroxide. The composition was roasted and could be reused as a desulfurizer. The composition had a sulfur capacity of 47.5%. After second, third, and fourth rounds of regeneration, the composition had a sulfur capacity of 45%, 43%, and 42%, respectively.

Preparation and Regeneration of the Desulfurizer 485 g composition H comprising amorphous iron oxide hydroxide with a particle size of 100 mesh, 40 g Sesbania powder, and 25 g wheat bran powder were mixed uniformly, kneaded with appropriate quantities of water using a small kneader, and extruded using a small twin screw extruder to yield a strip that was subsequently treated using a pill machine to yield a pill desulfurizer. The desulfurizer was roasted in an oven at 30° C. for 15 h and the sulfur capacity thereof was measured to be 42%. The desulfurizer was named desulfurizer A.

To a desulfurization reactor was added desulfurizer A. After passing $H_2S$ through the reactor, the resultant waste mixture was washed with water and ground in the presence of water using a wet ball mill into powders with a particle size of 100 mesh. An aqueous suspension of the powders was prepared with a solid weight percent of 10%, compressed air was charged, and a sample was collected for testing. When no $H_2S$ was produced from the reaction between the sample and hydrochloric acid, the iron sulfide in the suspension was determined to have been completely transformed into a slurry comprising amorphous iron oxide hydroxide and elemental sulfur. The slurry was placed in a flotation tank. After water was added and air was charged into the slurry, the elemental sulfur, additive, and binder were removed, together with excess air, by overflowing the tank. The precipitate at the bottom of the tank was a composition comprising amorphous iron oxide hydroxide. The overflowed elemental sulfur could be purified by some form of extraction procedure. The composition comprising amorphous iron oxide hydroxide was roasted at 80° C., and Sesbania and wheat bran powders were added in the proportions described above. The mixture was treated following the method and reaction conditions described above to yield a new desulfurizer (desulfurizer B) with a sulfur capacity of 41%.

The desulfurizer B was used for desulfurization and was regenerated according to the process described for the regeneration of desulfurizer A. A new desulfurizer (desulfurizer C) with a sulfur capacity of 38% was obtained.

Example 9

400 g regenerated desulfurizer E from Example 1 and 100 g prepared composition A comprising amorphous iron oxide hydroxide with a particle size of 100 mesh, 35 g Sesbania powder, and 20 g sawdust powder were mixed uniformly, kneaded with appropriate quantities of water using a small kneader, and extruded using a small twin screw extruder to yield a strip desulfurizer. The desulfurizer was dried naturally for 10 h and the sulfur capacity thereof was measured to be 43%.

In Examples 1-8, the ferrous sulfate powders were industrial raw materials with 88-90 wt. % $FeSO_4.7H_2O$, the sodium hydroxide was 90-93 wt. % NaOH, and the potassium hydroxide was 90-93 wt. % KOH.

Activity Evaluation

In the examples, the sulfur capacity was measured using a standard gas containing 40,000 ppm $H_2S$ at normal temperatures (between −5 and 45° C.) and normal pressures (generally, one atmospheric pressure). Specifically, for qualitative detection, sulfur from an outlet was detected using a 1% silver nitrate solution; sulfur was quantitatively measured using a WK-2C integrated microcoulometer (manufactured by Jiangsu Electroanalytical Instrument Factory), which had a minimal measurement volume of 0.2 ppm.

In the examples, the oven was an electric drying oven, and the kneader included but was not limited to a CD4×1TS multifunctional catalyst forming machine.

It should be noted that the desulfurizer of the invention comprises a composition comprising amorphous iron oxide hydroxide and a binder, and, optionally, an additive. The soluble ferrous salt is not limited to that disclosed in the examples and further comprises $FeSO_4.7H_2O$, $FeCl_2.4H_2O$, and $Fe(NO_3)_2.6H_2O$.

While particular embodiments of the invention have been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

The invention claimed is:

1. A method for preparing a composition comprising amorphous iron oxide hydroxide, the method comprising the following steps:
    a) mixing a solid soluble ferrous salt with a solid hydroxide in a molar ratio of iron element to hydroxyl of between 1:2 and 1:3 to yield a first mixture;
    b) kneading the first mixture, allowing it to react at a kneading temperature not exceeding 90° C., and drying in air to yield a second mixture;
    c) washing the second mixture with water and filtering to yield a third mixture; and
    d) drying the third mixture in air to yield the composition comprising amorphous iron oxide hydroxide.

2. The method of claim 1, wherein the kneading temperature does not exceed 70° C.

3. The method of claim 2, wherein the kneading temperature does not exceed 50° C.

4. The method of claim 1, wherein the amorphous iron oxide hydroxide constitutes between 65 weight % and 100 weight % of the composition.

5. The method of claim 4, wherein the amorphous iron oxide hydroxide constitutes between 95 weight % and 97 weight % of the composition.

* * * * *